(12) United States Patent
Yonemitsu et al.

(10) Patent No.: US 8,373,939 B2
(45) Date of Patent: Feb. 12, 2013

(54) LINEAR MOTION DEVICE AND LENS DRIVE DEVICE

(75) Inventors: Satoshi Yonemitsu, Kanagawa-ken (JP);
Shigeru Yokota, Kanagawa-ken (JP);
Hideki Samata, Kanagawa-ken (JP);
Noboru Uchida, Kanagawa-ken (JP);
Masahiro Yamamoto, Kanagawa-ken (JP)

(73) Assignee: Victor Company of Japan, Ltd., Yokohama (JP)

( * ) Notice: Subject to any disclaimer, the term of this patent is extended or adjusted under 35 U.S.C. 154(b) by 280 days.

(21) Appl. No.: 12/805,042

(22) Filed: Jul. 8, 2010

(65) Prior Publication Data
US 2011/0026147 A1 Feb. 3, 2011

(30) Foreign Application Priority Data
Jul. 30, 2009 (JP) .................... 2009-177769

(51) Int. Cl.
*G02B 7/02* (2006.01)
(52) U.S. Cl. ........................................ 359/822
(58) Field of Classification Search ............ 359/818, 359/822–824
See application file for complete search history.

(56) References Cited

U.S. PATENT DOCUMENTS
2009/0284856 A1 * 11/2009 Inata et al. ............ 359/824

FOREIGN PATENT DOCUMENTS
JP     09-033782    2/1997

* cited by examiner

*Primary Examiner* — Alicia M. Harrington
(74) *Attorney, Agent, or Firm* — Louis Woo

(57) ABSTRACT

A linear motion device includes a guide shaft. A to-be-moved member is supported on the guide shaft, and is linearly movable along the guide shaft. A lead screw extends parallel to the guide shaft. A clamper meshes with the lead screw. The clamper moves as the lead screw rotates. An intermediate member is provided between the to-be-moved member and the clamper. An urging member operates for urging the to-be-moved member toward the clamper and enabling the intermediate member to be seated between the to-be-moved member and the clamper in a manner such that an axis of the intermediate member is nonparallel to the guide shaft.

2 Claims, 9 Drawing Sheets

LINEAR MOTION DEVICE AND LENS DRIVE DEVICE

BACKGROUND OF THE INVENTION

1. Field of the Invention

This invention generally relates to a linear motion device and a lens drive device. The linear motion device can be used as, for example, an optical-pickup drive device. This invention particularly relates to a linear motion device and a lens drive device each including a mechanism for converting a rotational motion to a linear motion.

2. Description of the Related Art

Japanese patent application publication number 09-033782/1997 discloses a lens moving device including a feed screw, a barrel, a connector, and a lens frame. The barrel has a threaded hole through which the feed screw extends. The thread of the barrel meshes with the feed screw. As the feed screw rotates, the barrel moves linearly along the axis of the feed screw while being inhibited from rotating. The lens frame retains a lens. The lens frame is slidably supported by a pair of guide shafts extending parallel to the optical axis of the lens. The connector couples the barrel and the lens frame so that the lens frame and the lens will linearly move along the optical axis of the lens in accordance with the linear movement of the barrel. The connector includes a leaf spring member having a base end fixed to the barrel and a distal end formed with a projection. The lens frame has a recess into which the projection of the leaf spring member fits. Thereby, the leaf spring member engages with the lens frame.

In the lens moving device of Japanese patent application 09-033782/1997, a radial-direction play (backlash) between the lens frame and each guide shaft and another inter-parts play about each guide shaft lower the accuracy of the linear movement of the lens frame, that is, the accuracy of control of the axial-direction position of the lens. Accordingly, it is desirable to reduce or eliminate such a radial-direction play and an inter-parts play.

In the lens moving device of Japanese patent application 09-033782/1997, there is an inter-parts play concerning the lens frame which tends to cause axial-direction positional errors of the lens frame and the lens. Accordingly, it is desirable to reduce or eliminate such an inter-parts play.

SUMMARY OF THE INVENTION

It is a first object of this invention to provide a linear motion device in which a to-be-moved member is supported by a guide shaft, and a play between the to-be-moved member and the guide shaft and an axial-direction positional error of the to-be-moved member are reduced or eliminated by a simple mechanism.

It is a second object of this invention to provide a lens drive device in which a to-be-moved member is supported by a guide shaft, and a play between the to-be-moved member and the guide shaft and an axial-direction positional error of the to-be-moved member are reduced or eliminated by a simple mechanism.

A first aspect of this invention provides a linear motion device comprising a guide shaft; a to-be-moved member supported on the guide shaft and being linearly movable along the guide shaft; a lead screw extending parallel to the guide shaft; a clamper meshing with the lead screw and moving as the lead screw rotates; an intermediate member provided between the to-be-moved member and the clamper; and an urging member for urging the to-be-moved member toward the clamper and enabling the intermediate member to be seated between the to-be-moved member and the clamper in a manner such that an axis of the intermediate member is nonparallel to the guide shaft.

A second aspect of this invention is based on the first aspect thereof, and provides a linear motion device further comprising a holder for holding the intermediate member on one of the to-be-moved member and the clamper.

A third aspect of this invention is based on the first aspect thereof, and provides a linear motion device further comprising means for limiting movement of the to-be-moved member and defining a movable range of the to-be-moved member, wherein the clamper moves together with the to-be-moved member when the to-be-moved member is in its movable range except ends thereof, and the clamper moves separately from the to-be-moved member when the to-be-moved member is held in a position at one of the ends of its movable range by the limiting means.

A fourth aspect of this invention provides a lens drive device comprising a guide shaft; a lens frame supported on the guide shaft and being linearly movable along the guide shaft; a lead screw extending parallel to the guide shaft; a clamper meshing with the lead screw and moving as the lead screw rotates; an intermediate member provided between the lens frame and the clamper; and an urging member for urging the lens frame toward the clamper and enabling the intermediate member to be seated between the lens frame and the clamper in a manner such that an axis of the intermediate member is nonparallel to the guide shaft.

A fifth aspect of this invention is based on the fourth aspect thereof, and provides a lens drive device further comprising a holder for holding the intermediate member on one of the lens frame and the clamper.

A sixth aspect of this invention is based on the fourth aspect thereof, and provides a lens drive device further comprising means for limiting movement of the lens frame and defining a movable range of the lens frame, wherein the clamper moves together with the lens frame when the lens frame is in its movable range except ends thereof, and the clamper moves separately from the lens frame when the lens frame is held in a position at one of the ends of its movable range by the limiting means.

A seventh aspect of this invention provides a linear motion device comprising a guide shaft; a to-be-moved member supported on the guide shaft and being linearly movable along the guide shaft; and means for urging the to-be-moved member in a direction nonparallel to the guide shaft to eliminate a play between the to-be-moved member and the guide shaft.

An eighth aspect of this invention is based on the seventh aspect thereof, and provides a linear motion device further comprising means for linearly moving the to-be-moved member along the guide shaft.

A ninth aspect of this invention is based on the eighth aspect thereof, and provides a linear motion device wherein the linearly moving means comprises a clamper, means for linearly moving the clamper in a direction parallel to the guide shaft, and an intermediate member seated between the clamper and the to-be-moved member to transmit a force therebetween.

A tenth aspect of this invention is based on the ninth aspect thereof, and provides a linear motion device wherein the intermediate member has an axis nonparallel to the guide shaft.

DETAILED DESCRIPTION OF THE INVENTION

Figure 1:
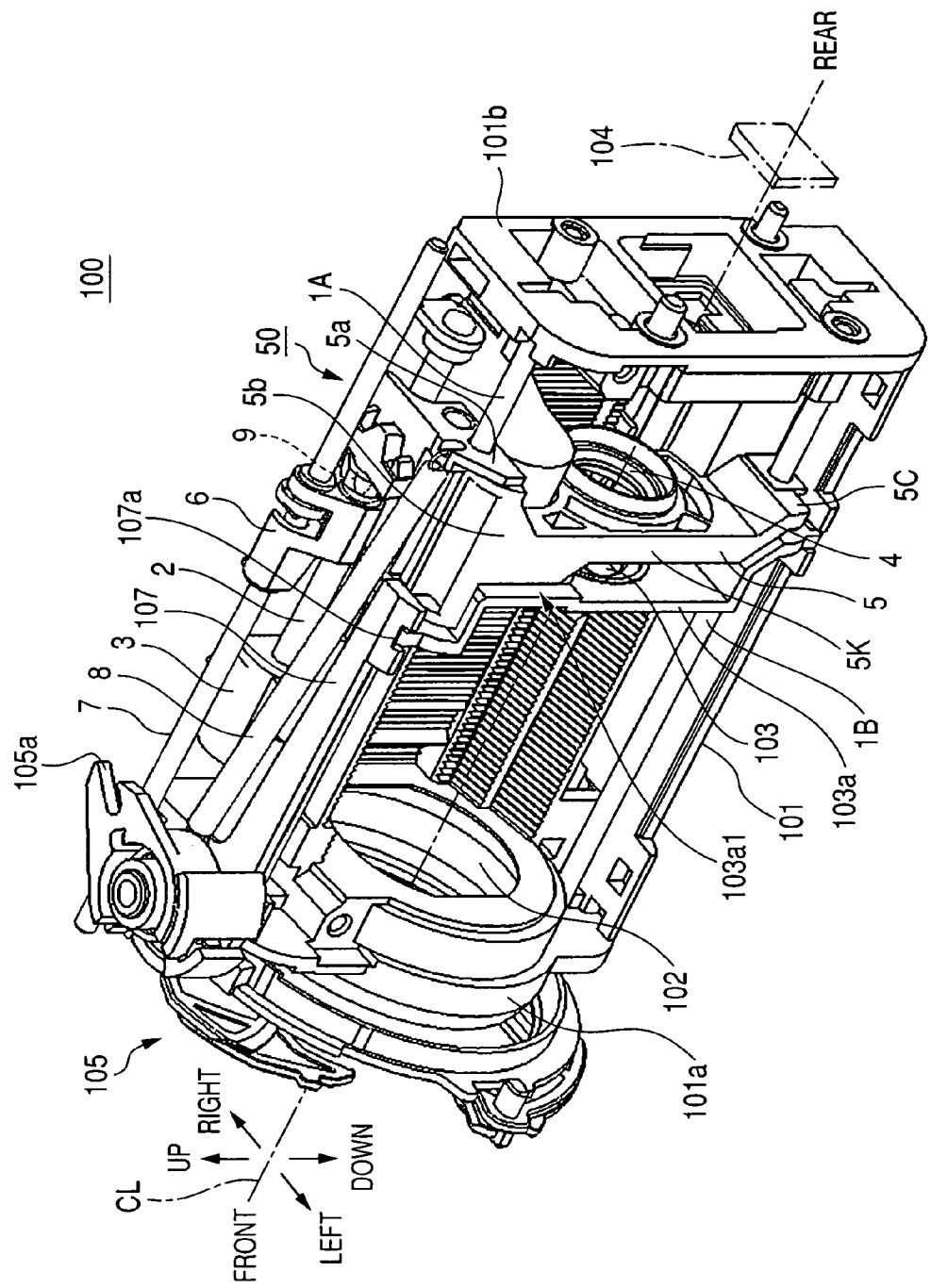
FIG. 1 is a perspective view of an optical block including a lens drive device (a linear motion device) according to an embodiment of this invention.

FIG. 1 shows an optical block 100 including a linear motion device or a lens drive device 50 according to an embodiment of this invention. The optical block 100 is placed in an image taking apparatus such a video camera. The optical block 100 has a front normally facing a subject and a rear opposite to the front.

As shown in FIG. 1, the optical block 100 includes a casing 101, a front fixed lens 102, and a mid fixed lens 103. The casing 101 has a front wall portion 101a, a rear wall portion 101b, and an intermediate wall portion connected between the front wall portion 101a and the rear wall portion 101b. The front wall portion 101a defines the front of the optical block 100. The rear wall portion 101b defines the rear of the optical block 100. The front fixed lens 102 is secured to the front wall portion 101a. The mid fixed lens 103 is secured to the intermediate wall portion of the casing 101 by a fixed-lens retaining frame 103a. The front fixed lens 102 and the mid fixed lens 103 are axially aligned so as to have a common optical axis CL.

An image sensor 104 is attached to the rear wall portion 101b. The image sensor 104 is centered at the optical axis CL so that the front fixed lens 102, the mid fixed lens 103, and the image sensor 104 are axially aligned. An image of the subject can be focused onto the image sensor 104 through the optical block 100. The image sensor 104 converts the image of the subject into an electric signal, and outputs the electric signal.

A pair of parallel straight guide shafts 1A and 1B are attached to the casing 101. The guide shafts 1A and 1B extend between the front wall portion 101a and the rear wall portion 101b of the casing 10. The guide shafts 1A and 1B are parallel to the optical axis CL. The guide shaft 1A is located above the optical axis CL as viewed in FIG. 1. On the other hand, the guide shaft 1B is located below the optical axis CL.

A lead screw 2 is provided on the casing 101. The lead screw 2 extends parallel to the guide shafts 1A and 1B. The lead screw 2 can be circumferentially rotated by a motor 3 supported on the casing 101.

A lens barrier 105 is provided in front of the front fixed lens 102. The lens barrier 105 is movable between an open position and a closed position. The front fixed lens 102 is exposed when the lens barrier 105 assumes its open position. The lens barrier 105 conceals the front fixed lens 102 when assuming its closed position.

The guide shafts 1A and 1B support a lens frame 5 retaining a movable lens 4. The lens frame 5 can slide or move back and forth along the guide shafts 1A and 1B. In other words, the lens frame 5 can reciprocate along the guide shafts 1A and 1B. Thus, the lens frame 5 is linearly movable in two opposite directions parallel to the optical axis CL. The lens frame 5 is a to-be-moved member. The movable lens 4 is located between the mid fixed lens 103 and the image sensor 104. The movable lens 4 is axially aligned with the front fixed lens 102 and the mid fixed lens 103 so that the optical axis of the movable lens 4 coincides with the optical axis CL.

The lens frame 5 has a base 5k and two arms 5b and 5c. The base 5k holds the movable lens 4. The arms 5b and 5c extend from the base 5k in two opposite directions, respectively. Specifically, the arm 5b extends upward from the base 5k as viewed in FIG. 1. On the other hand, the arm 5c extends downward from the base 5k. The arm 5b engages with the guide shaft 1A. The arm 5c engages with the guide shaft 1B. The arm 5b is formed with a flange 5a.

The lens frame 5 can reciprocate in a predetermined range defined between the mid fixed lens 103 and the rear wall portion 101b. The movable lens 4 moves together with the lens frame 5. A focusing action or a zooming action can be implemented in accordance with the movement of the movable lens 4.

The front wall portion 101a of the casing 101 has an arm 107 extending and projecting toward the rear wall portion 101b thereof. A distal end of the arm 107 has an engagement portion 107a. An end of the fixed-lens retaining frame 103a is securely connected with the engagement portion 107a so that the fixed-lens retaining frame 103a is fixed to the casing 101. A portion of the fixed-lens retaining frame 103a has a flat surface forming a movement limiting surface 103a1 (see FIG. 6 also). As the lens frame 5 moves frontward, the lens frame 5 meets the movement limiting surface 103a1 of the fixed-lens retaining frame 103a. The lens frame 5 is stopped when meeting the movement limiting surface 103a1. In this way, the movement of the lens frame 5 is limited by the fixed-lens retaining frame 103a.

A clamper 6 is slidably supported on a straight clamper shaft 7 provided in the image taking apparatus. The clamper shaft 7 extends parallel to the optical axis CL. The clamper 6 can move back and forth along the clamper shaft 7. Thus, the clamper 6 is linearly movable in two opposite directions parallel to the optical axis CL. The clamper 6 is in an axial position preceding the axial position of the lens frame 5.

The clamper 6 has rack teeth 6a1 (see FIG. 3) meshing with a thread on the lead screw 2. Therefore, as the lead screw 2 is rotated by the motor 3 in one circumferential direction, the clamper 6 is moved frontward along the clamper shaft 7 in a direction parallel to the optical axis CL while being inhibited by the clamper shaft 7 from rotating. On the other hand, as the lead screw 2 is rotated in the other circumferential direction, the clamper 6 is moved rearward.

A coil spring or a helical spring 8 is provided between the front wall portion 101a of the casing 101 and the flange 5a of the lens frame 5. The coil spring 8 urges the lens frame 5 toward the clamper 6. Thus, the coil spring 8 serves as an urging member. The axis of the coil spring 8 is nonparallel to the optical axis CL.

Figure 2:
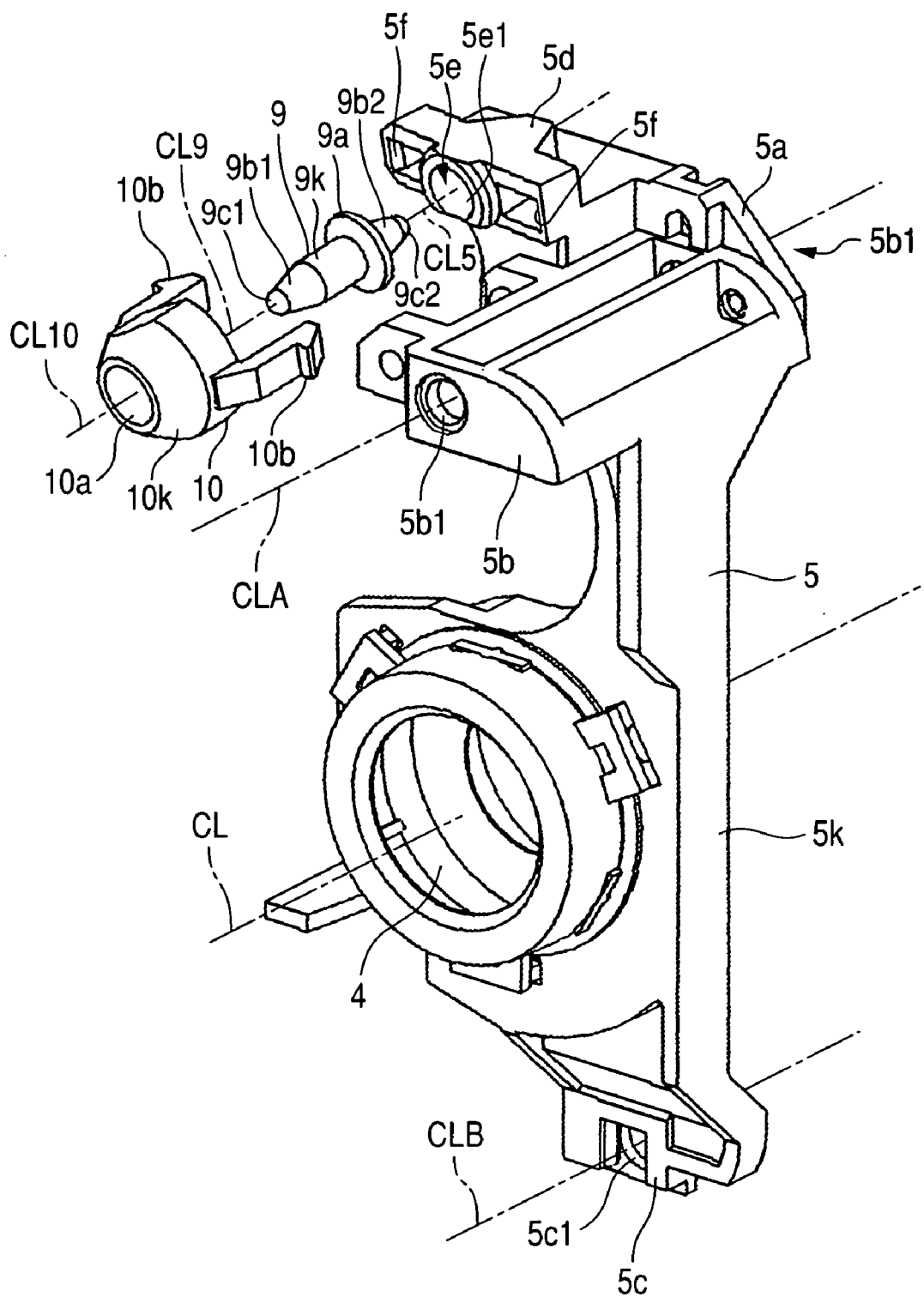
FIG. 2 is an exploded perspective view of a movable lens, a lens frame for the movable lens, an engagement bar, and a holder for the engagement bar in the lens drive device of FIG. 1.
Figure 3:
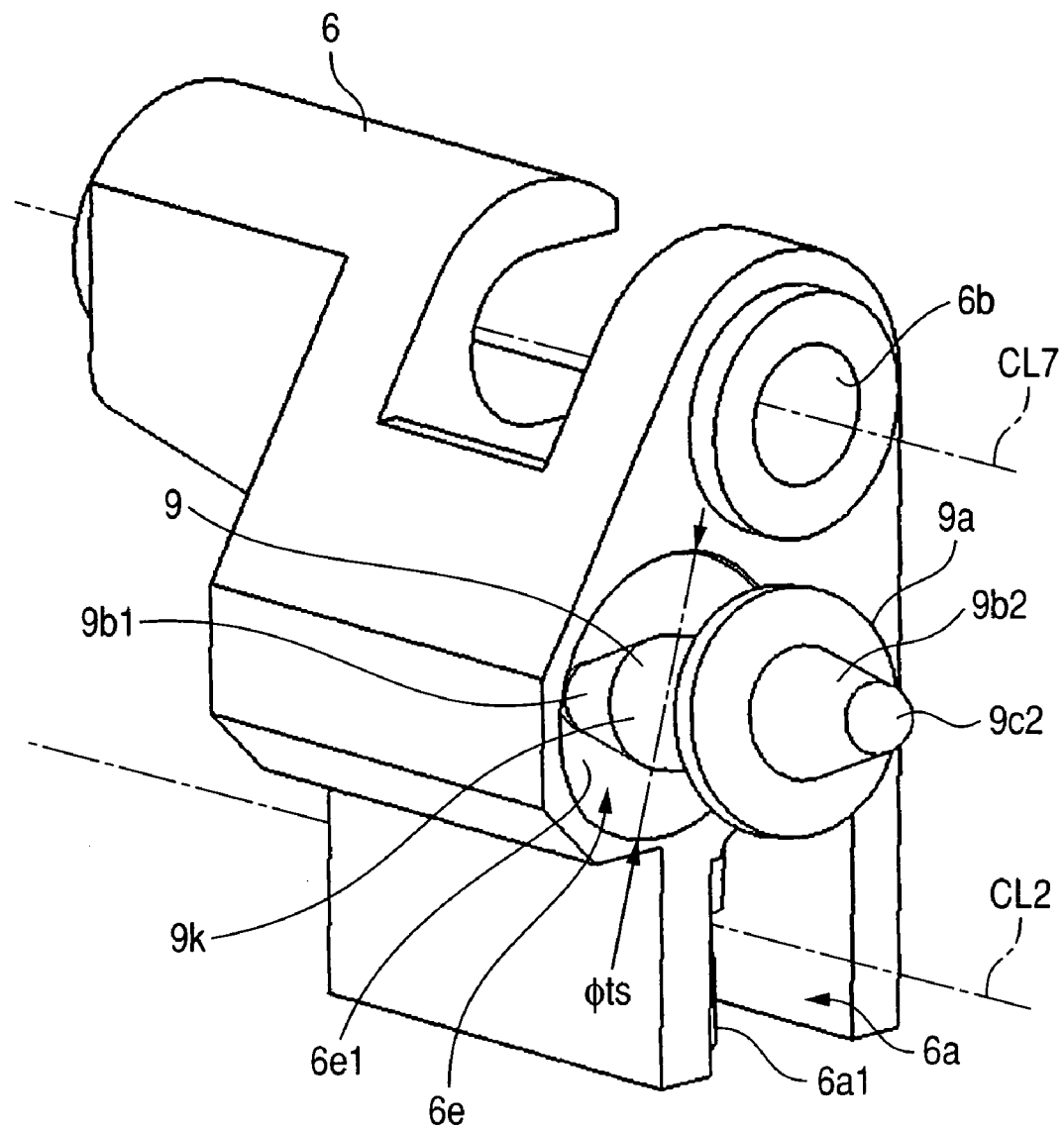
FIG. 3 is a perspective view of a clamper and the engagement bar in the lens drive device of FIG. 1.
Figure 4:
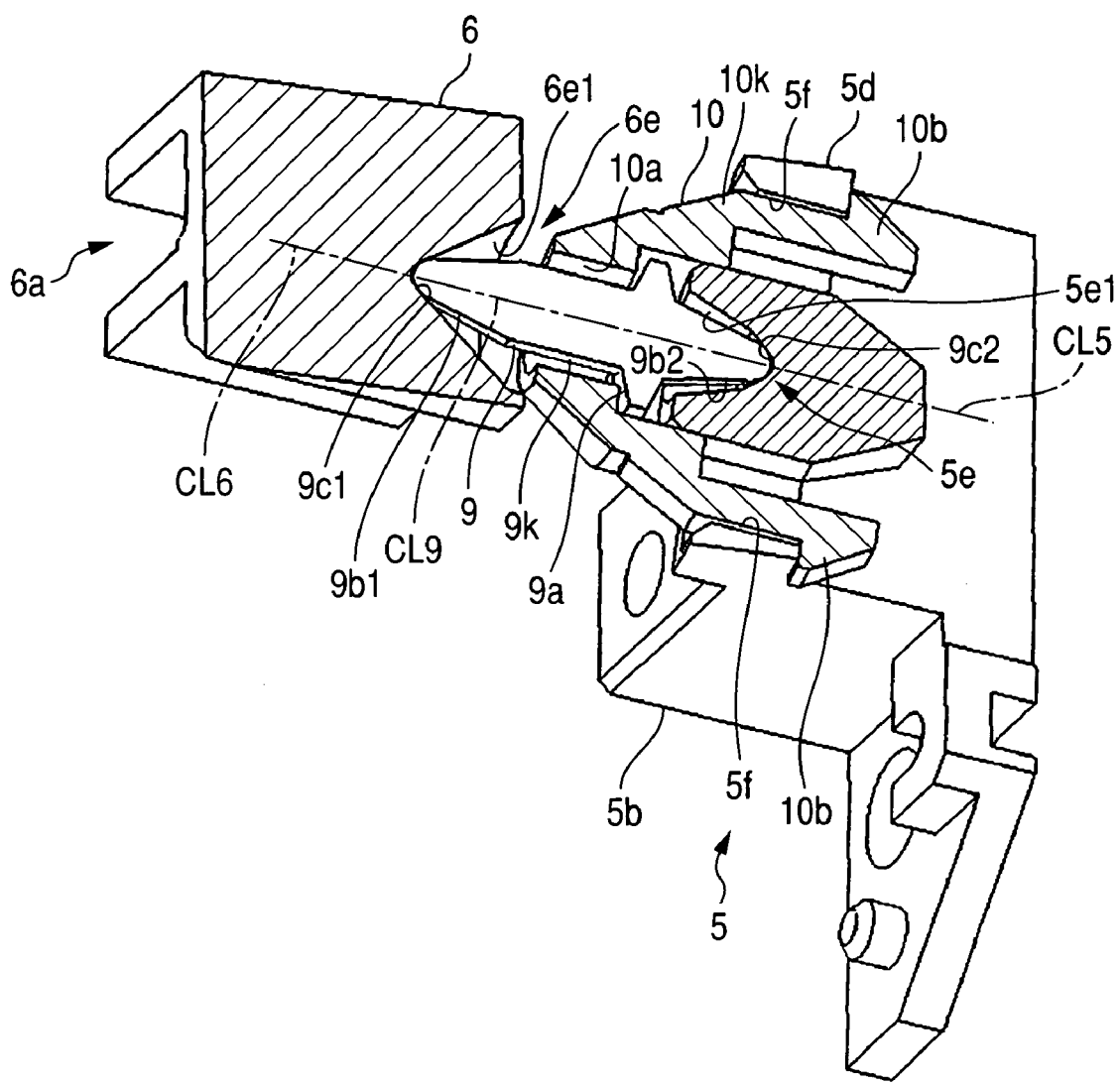
FIG. 4 is a sectional view of the lens frame, the engagement bar, the holder for the engagement bar, and the clamper in the lens drive device of FIG. 1.

With reference to FIGS. 2-4, an engagement bar (a brace or strut bar) 9 serving as a power transmission member is provided between the lens frame 5 and the clamper 6. The engagement bar 9 is an intermediate member or a sandwiched member between the lens frame 5 and the clamper 6. The lens frame 5 holds the engagement bar 9 through a holder 10. Normally, the engagement bar 9 contacts with both the lens frame 5 and the clamp 6. The engagement bar 9 is of an approximately cylindrical shape having an axis CL9. The engagement bar 9 has a front end and a rear end.

As best shown in FIG. 2, the arm 5b of the lens frame 5 has a hole 5b1 through which the guide shaft 1A (see FIG. 1) extends. The arm 5c of the lens frame 5 has a hole 5c1 through which the guide shaft 1B (see FIG. 1) extends. In FIG. 2, the longitudinal axes of the guide shafts 1A and 1B are denoted by the reference characters "CLA" and "CLB", respectively. The axes CLA and CLB of the guide shafts 1A and 1B are parallel to the optical axis CL.

As shown in FIGS. 2 and 4, the arm 5b of the lens frame 5 has a wall portion 5d forming an abutment section 5e normally in contact with the rear end of the engagement bar 9. The arm 5b has a pair of holes 5f for receiving projections (arms) 10b of the holder 10 respectively. The holes 5f are located in opposite sides of the abutment section 5e, respectively.

The abutment section 5e of the lens frame 5 takes a cone shape having a concave surface 5e1. The cone shape of the abutment section 5e has an axis CL5 nonparallel to the optical axis CL. The concave surface 5e1 conforms with a side surface of a cone. In FIG. 4, the axis CL9 of the engagement bar 9 and the axis CL5 of the abutment section 5e coincide with each other.

The engagement bar 9 has a cylindrical base 9k, an annular flange 9a, conical or tapered portions 9b1 and 9b2, and hemispherical portions 9c1 and 9c2 which are coaxial and integral with each other. The base 9k consists of a bar having a circular cross-section. The base 9k has a front end and a rear end. The flange 9a radially projects from and circumferentially extends around the base 9k. The axial position of the flange 9a relative to the base 9k is off from the axial middle point on the base 9k. Specifically, the flange 9a is closer to the rear end of the base 9k than the front end thereof. The conical portion 9b1 extends coaxially and frontward from the front end of the base 9k. The hemispherical portion 9c1 extends coaxially and frontward from the conical portion 9b1. The hemispherical portion 9c1 defines the front end of the engagement bar 9. The conical portion 9b1 and the hemispherical portion 9c1 are designed so that the diameter of a related portion of the engagement bar 9 at an axial position decreases as the axial position moves toward the front end of the engagement bar 9. The axial position of the conical portion 9b1 precedes the axial position of the flange 9a. The conical portion 9b2 extends coaxially and rearward from the rear end of the base 9k. The hemispherical portion 9c2 extends coaxially and rearward from the conical portion 9b2. The hemispherical portion 9c2 defines the rear end of the engagement bar 9. The conical portion 9b2 and the hemispherical portion 9c2 are designed so that the diameter of a related portion of the engagement bar 9 at an axial position decreases as the axial position moves toward the rear end of the engagement bar 9. The axial position of the conical portion 9b2 follows the axial position of the flange 9a.

The holder 10 has an approximately cup-shaped base 10k, and a pair of arms 10b projecting from the base 10k. The base 10k has a hole 10a extending through a bottom wall thereof. The hole 10a is coaxial with the base 10k. The arms 10b axially project from an open end of the base 10k. The arms 10b are diametrically opposed to each other. The diameter of the hole 10a is greater than that of the base 9k of the engagement bar 9 but smaller than the outside diameter of the flange 9a thereof. Thus, the base 9k of the engagement bar 9 can be inserted through the hole 10a of the holder 10 along a frontward direction until the flange 9a thereof meets a wall of the holder 10 which defines the hole 10a.

As shown in FIG. 3, the clamper 6 has a U-shaped recess 6a, and the rack teeth 6a1 which define a side of the recess 6a. The lead screw 2 (see FIG. 1) extends through the recess 6a. In FIG. 3, the axis of the lead screw 2 is denoted by the reference character "CL2". The rack teeth 6a1 mesh with the thread on the lead screw 2.

The clamper 6 has a hole 6b through which the clamper shaft 7 (see FIG. 1) extends. The clamper 6 engages with the clamper shaft 7. The clamper 6 can slide or move relative to the clamper shaft 7. In FIG. 3, the longitudinal axis of the clamper shaft 7 is denoted by the reference character "CL7".

The mesh between the rack teeth 6a on the clamper 6 and the thread on the lead screw 2, and the engagement between the clamper 6 and the clamper shaft 7 are designed so that the clamper 6 linearly moves along the clamper shaft 7 as the lead screw 2 rotates circumferentially. The clamper shaft 7 inhibits the clamper 6 from being rotated by the lead screw 2.

The clamper 6 has an abutment section 6e located between the recess 6a and the hole 6b. The abutment section 6e takes a cone shape having a concave surface 6e1. The cone shape of the abutment section 6e has an axis CL6 (see FIG. 4) nonparallel to the optical axis CL (see FIG. 1). The concave surface 6e1 conforms with a side surface of a cone. In FIG. 4, the axis CL9 of the engagement bar 9 and the axis CL6 of the abutment section 6e coincide with each other.

As shown in FIG. 4, the engagement bar 9 is seated between the abutment section 6e of the clamper 6 and the abutment section 5e of the lens frame 5 which is urged toward the clamper 6 by the coil spring 8 (see FIG. 1). The engagement bar 9 acts like a brace or a strut, and limits movement of the lens frame 5 toward the clamper 6 and movement of the clamper 6 toward the lens frame 5. The engagement bar 9 maintains the separation between the lens frame 5 and the clamper 6 while allowing the transmission of a force (a power) therebetween. In this regard, the engagement bar 9 is called the brace bar 9 or the strut bar 9 also.

The hemispherical portion 9c2 of the engagement bar 9 and the concave surface 5e1 of the abutment section 5e of the lens frame 5 are brought into contact with each other. The hemispherical portion 9c2 continuously and coaxially extends from the conical portion 9b2 of the engagement bar 9. The apex angle (opening angle) of the conical portion 9b2 is chosen to be smaller than that of the concave surface 5e1. Therefore, the axis CL9 of the engagement bar 9 is allowed to incline from the axis CL5 of the abutment section 5e within a predetermined angular range while the hemispherical portion 9c2 and the concave surface 5e1 are in contact with each other. The predetermined angular range has a limit at which the conical portion 9b2 meets the concave surface 5e1. The radius of curvature of the hemispherical portion 9c2 is chosen to be greater than that of the concave surface 5e1. The position on the concave surface 5e1 at which the concave surface 5e1 contacts the hemispherical portion 9c2 is decided by not only the radius of curvature of the concave surface 5e1 but also the radius of curvature of the hemispherical portion 9c2.

Normally, the hemispherical portion 9c1 of the engagement bar 9 and the concave surface 6e1 of the abutment section 6e of the clamper 6 are brought into contact with each other. The hemispherical portion 9c1 extends continuously and coaxially from the conical portion 9b1 of the engagement bar 9. The apex angle (opening angle) of the conical portion 9b1 is chosen to be smaller than that of the concave surface 6e1. Therefore, the axis CL9 of the engagement bar 9 is allowed to incline from the axis CL6 of the abutment section 6e within a predetermined angular range while the hemispherical portion 9c1 and the concave surface 6e1 are in contact with each other. The predetermined angular range has a limit at which the conical portion 9b1 meets the concave surface 6e1. The radius of curvature of the hemispherical portion 9c1 is chosen to be greater than that of the concave surface 6e1. The position on the concave surface 6e1 at which the concave surface 6e1 contacts the hemispherical portion 9c1 is decided by not only the radius of curvature of the concave surface 6e1 but also the radius of curvature of the hemispherical portion 9c1.

In this way, the lens frame 5 and the clamper 6 are normally connected via the engagement bar 9. The connection between the lens frame 5 and the clamper 6 is such that a relative position or a relative posture therebetween can vary. Thus, a force can be transmitted between the lens frame 5 and the clamper 6 through the engagement bar 9 even when the relative position or posture therebetween varies.

As shown in FIGS. 2 and 4, the holder 10 enables the engagement bar 9 to be held by the lens frame 5. The holder 10 is provided in the lens drive device 50 (see FIG. 1).

The base 9k of the engagement bar 9 extends through the hole 10a of the holder 10. The arms 10b of the holder 10 extend or fit into the holes 5f of the lens frame 5, respectively. Each of the arms 10b has a hook at its tip. The hooks of the arms 10b engage with the walls of the lens frame 5 which define back ends of the holes 5f, respectively. Thereby, the holder 10 is mounted or supported on the lens frame 5. The flange 9a of the engagement bar 9 is located within the holder 10. Since the outside diameter of the flange 9a is greater than the diameter of the hole 10a of the holder 10, the flange 9 is inhibited from moving through the hole 10a. An intermediate portion, the flange 9a, and the rear end of the engagement bar 9 are placed in the holder 10. The engagement bar 9 is held by the lens frame 5 via the holder 10.

The diameter of the hole 10a of the holder 10 is greater than the diameter of the base 9k of the engagement bar 9. The difference of the diameter of the hole 10a from that of the base 9k of the engagement bar 9 determines an angular range in which the axis CL9 of the engagement bar 9 can incline from the axis CL5 of the abutment section 5e of the lens frame 5 or the axis CL6 of the abutment section 6e of the clamper 6.

Figure 5:
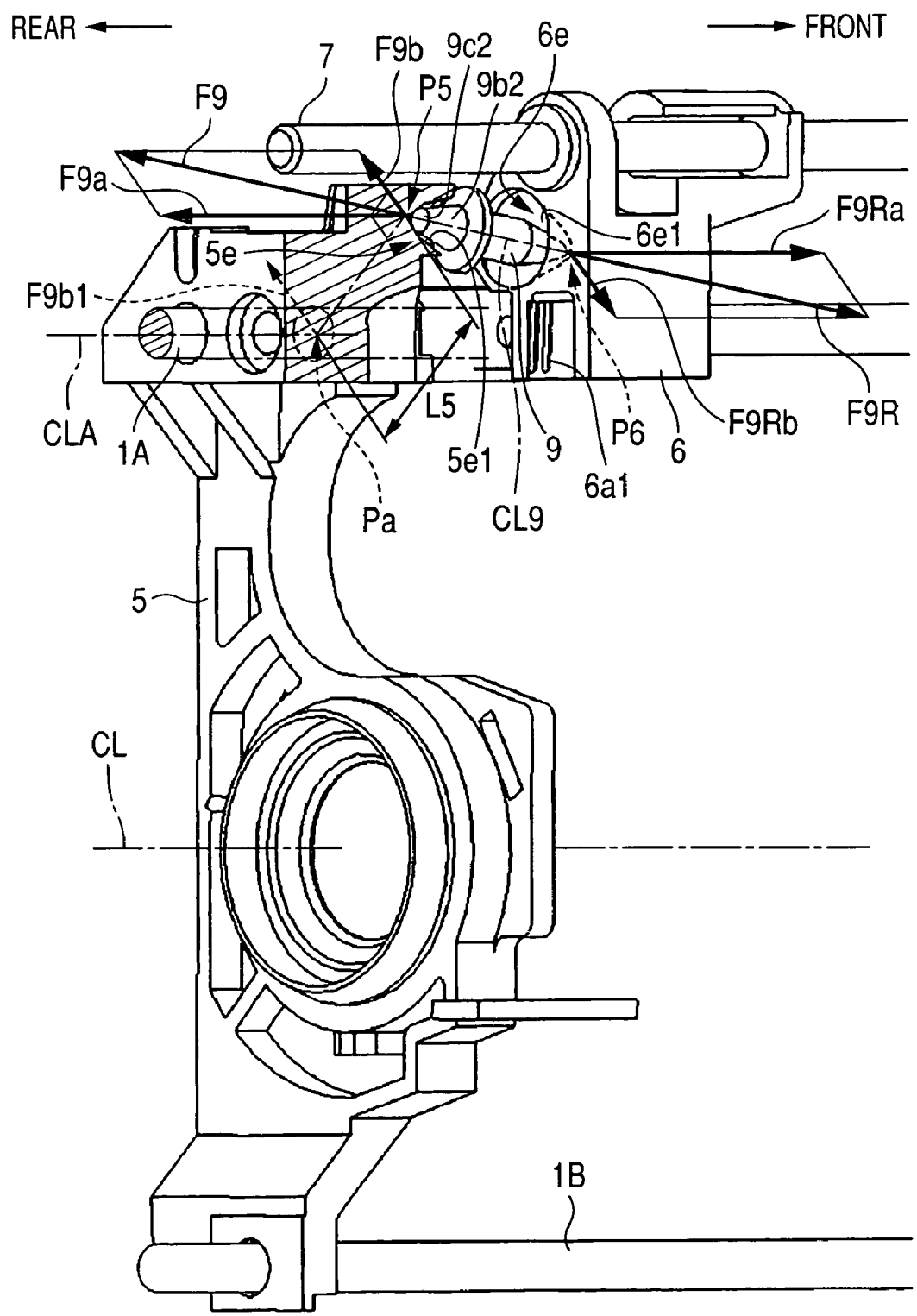
FIG. 5 is a perspective view of the lens frame, the clamper, the engagement bar, and related parts in the lens drive device of FIG. 1.

With reference to FIG. 5, the axis CL9 of the engagement bar 9 is nonparallel to the optical axis CL. Since the hemispherical portion 9b2 of the engagement bar 9 contacts the concave surface 5e1 of the abutment section 5e of the lens frame 5, a force F9 is applied from the engagement bar 9 to the lens frame 5. In FIG. 5, the point of contact between the engagement bar 9 and the lens frame 5 is denoted by the character "P5". The force F9 occurs at the contact point P5, and points in the direction of the axis CL9 of the engagement bar 9.

The force F9 is expressed by a vector pointing in a direction nonparallel and nonperpendicular to the optical axis CL. The force F9 is divided into a component F9a pointing in a direction parallel to the optical axis CL and another component F9b.

A virtual plane is introduced which contains the contact point P5, and which is perpendicular to the optical axis CL. The virtual plane meets the axis CLA of the guide shaft 1A at a point Pa called a center of the guide shaft 1A. A line segment having a length L5 extends between the contact point P5 and the guide-shaft center Pa. Preferably, the engagement bar 9 and the lens frame 5 are arranged so that the axis CL9 of the engagement bar 9 will be on a plane perpendicular to the above-mentioned line segment. Preferably, the posture of the engagement bar 9 (specifically, the direction of the axis CL9 of the engagement bar 9) relative to the lens frame 5 is designed so that the direction of the force component F9b will be perpendicular to the above-mentioned line segment. Thus, in this case, the axis CL9 of the engagement bar 9 is perpendicular to the above-mentioned line segment.

The force component F9b presses the lens frame 5 against the guide shaft 1A with a force F9b1 which is parallel to the force component F9b and is equal thereto in magnitude, and which points in a radial direction with respect to the guide shaft 1A. As a result, a radial-direction play (backlash) between the guide shaft 1A and the lens frame 5 is eliminated or removed. Similarly, a radial-direction play between the guide shaft 1B and the lens frame 5 is eliminated or removed.

The lens frame 5 is subjected to a moment M about the guide shaft 1A. The moment M is equal to the product of the length L5 of the line segment and the magnitude of the force component F9b. The moment M eliminates or removes an inter-parts play causing an error of the position of the lens frame 5 in a circumferential direction with respect to the optical axis CL.

In the case where the axis CL9 of the engagement bar 9 is nonparallel to the axis CLA of the guide shaft 1A, there occur a force pressing the lens frame 5 against the guide shaft 1A in a radial direction with respect to the guide shaft 1A and a moment exerted on the lens frame 5 about the guide shaft 1A. Therefore, in this case, it is possible to eliminate or remove an inter-parts play causing an error of the position of the lens frame 5 in a direction perpendicular to the optical axis CL and an inter-parts play causing an error of the position of the lens frame 5 in a circumferential direction with respect to the optical axis CL.

In the case where the direction of the force component F9b and the direction of the axis CL9 of the engagement bar 9 are perpendicular to the previously-mentioned line segment, an urging force applied from the coil spring 8 to the lens frame 5 is most efficiently used for reducing errors of the position of the lens frame 5.

Since the hemispherical portion 9b1 of the engagement bar 9 contacts the concave surface 6e1 of the abutment section 6e of the clamper 6, a force F9R is applied from the engagement bar 9 to the clamper 6. In FIG. 5, the point of contact between the engagement bar 9 and the clamper 6 is denoted by the character "P6".

The force F9R act on the contact point P6, and is expressed by a vector pointing in a direction nonparallel and nonperpendicular to the optical axis CL. The force F9R is divided into a component F9Ra pointing in a direction parallel to the optical axis CL and another component F9Rb.

The force component F9Ra urges the clamper 6 in a direction parallel to the optical axis CL so that the rack teeth 6a1 on the clamper 6 is pressed against the thread on the lead screw 2 along a direction parallel to the optical axis CL. Thereby, an axial-direction inter-parts play such as an axial-direction backlash is prevented from occurring in the mesh between the rack teeth 6a1 and the lead-screw thread.

The force component F9Rb urges the clamper 6 toward the lead screw 2 in a radial direction with respect to the lead screw 2 so that the mesh between the rack teeth 6a1 and the lead-screw thread can be sure and reliable. Therefore, the rack teeth 6a1 and the lead-screw thread can not easily move out of mesh even when a shock or a vibration is applied to the clamper 6 or the lead screw 2 from an external.

Normally, the engagement bar 9 is seated between the lens frame 5 and the clamper 6 while being movable relative to both the lens frame 5 and the clamper 6. The axis CL9 of the engagement bar 9 is allowed to tilt from the axis CL5 of the concave surface 5e1 of the lens frame and the axis CL6 of the concave surface 6e1 of the clamper 6 in certain angular ranges. Accordingly, the engagement bar 9 transmits a force (a power) between the lens frame 5 and the clamper 6 without limiting the relative position and the relative posture therebetween.

Thus, even when the clamper 6 shakes as the lead screw 2 undulates, the shake is prevented from traveling from the clamper 6 to the lens frame 5 through the engagement bar 9. Therefore, it is possible to accurately perform linear movement of the lens frame 5 along the optical axis CL.

Figure 6:
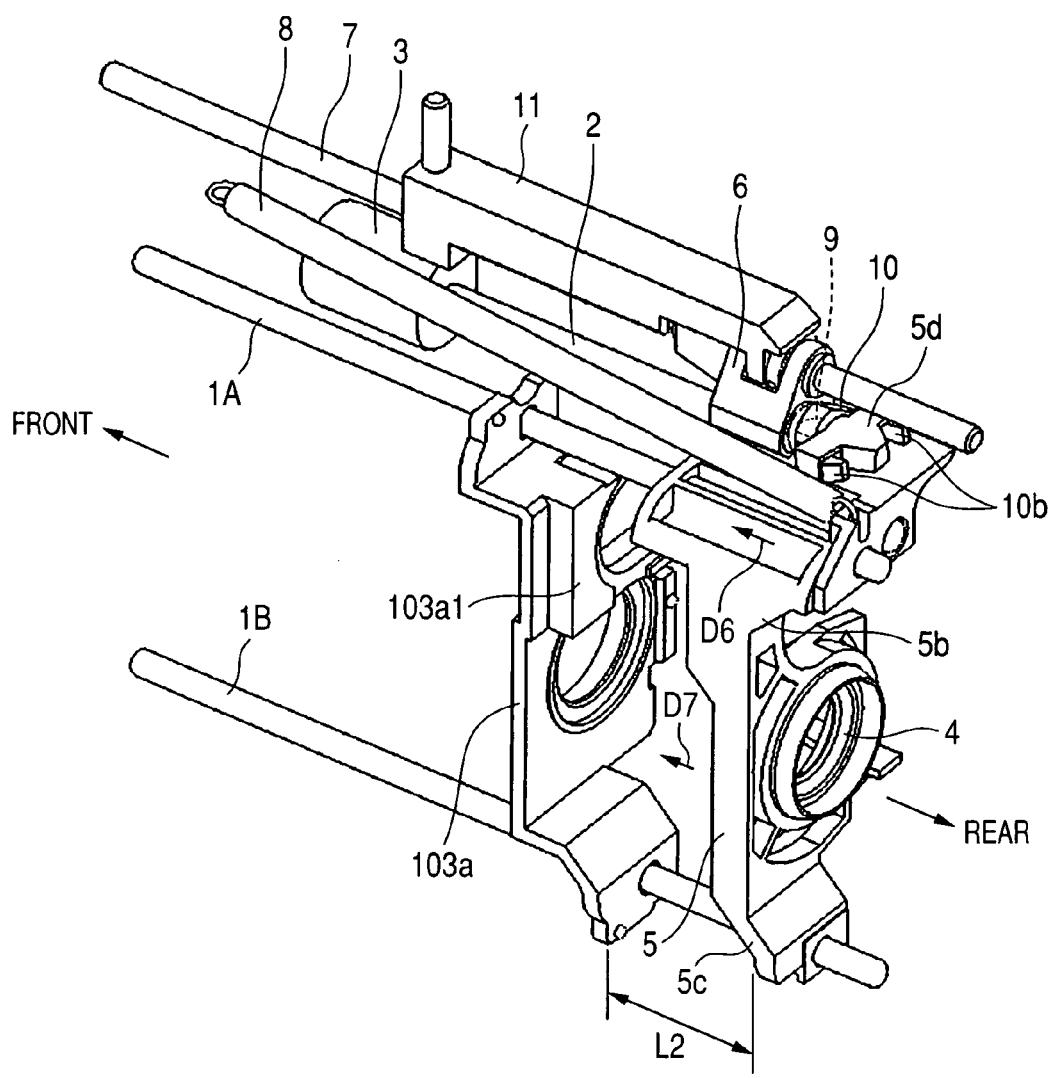
FIG. 6 is a perspective view of the movable lens, the lens frame for the movable lens, the clamper, a fixed-lens retaining frame, and related parts in the lens drive device of FIG. 1 in which the lens frame for the movable lens assumes its rearmost position.
Figure 7:
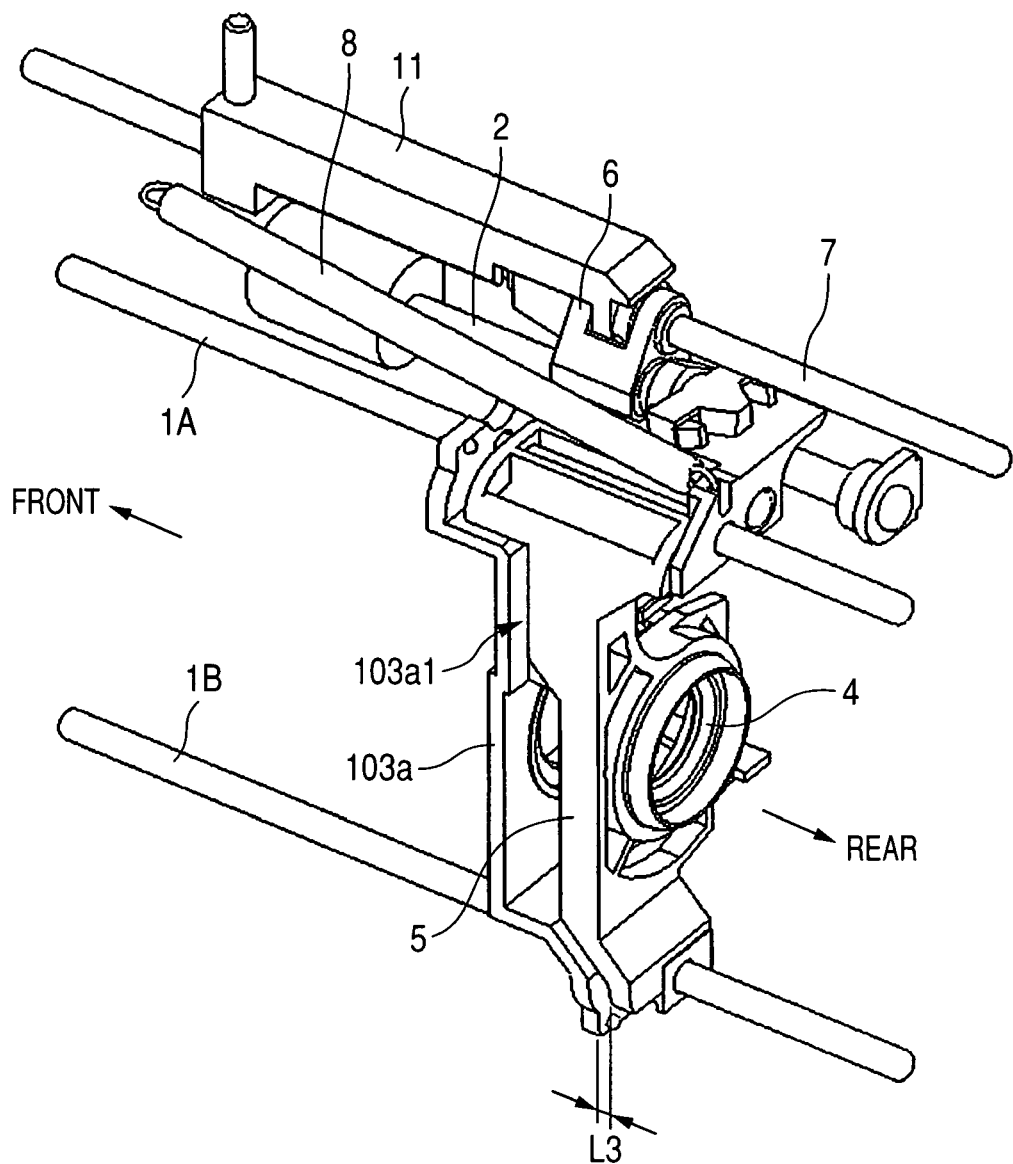
FIG. 7 is a perspective view of the movable lens, the lens frame for the movable lens, the clamper, the fixed-lens retaining frame, and the related parts in the lens drive device of FIG. 1 in which the lens frame for the movable lens and the clamper are in their positions occurring upon the contact of the lens frame for the movable lens with a movement limiting surface on the fixed-lens retaining frame, and therefore the lens frame for the movable lens is in its frontest position.
Figure 8:
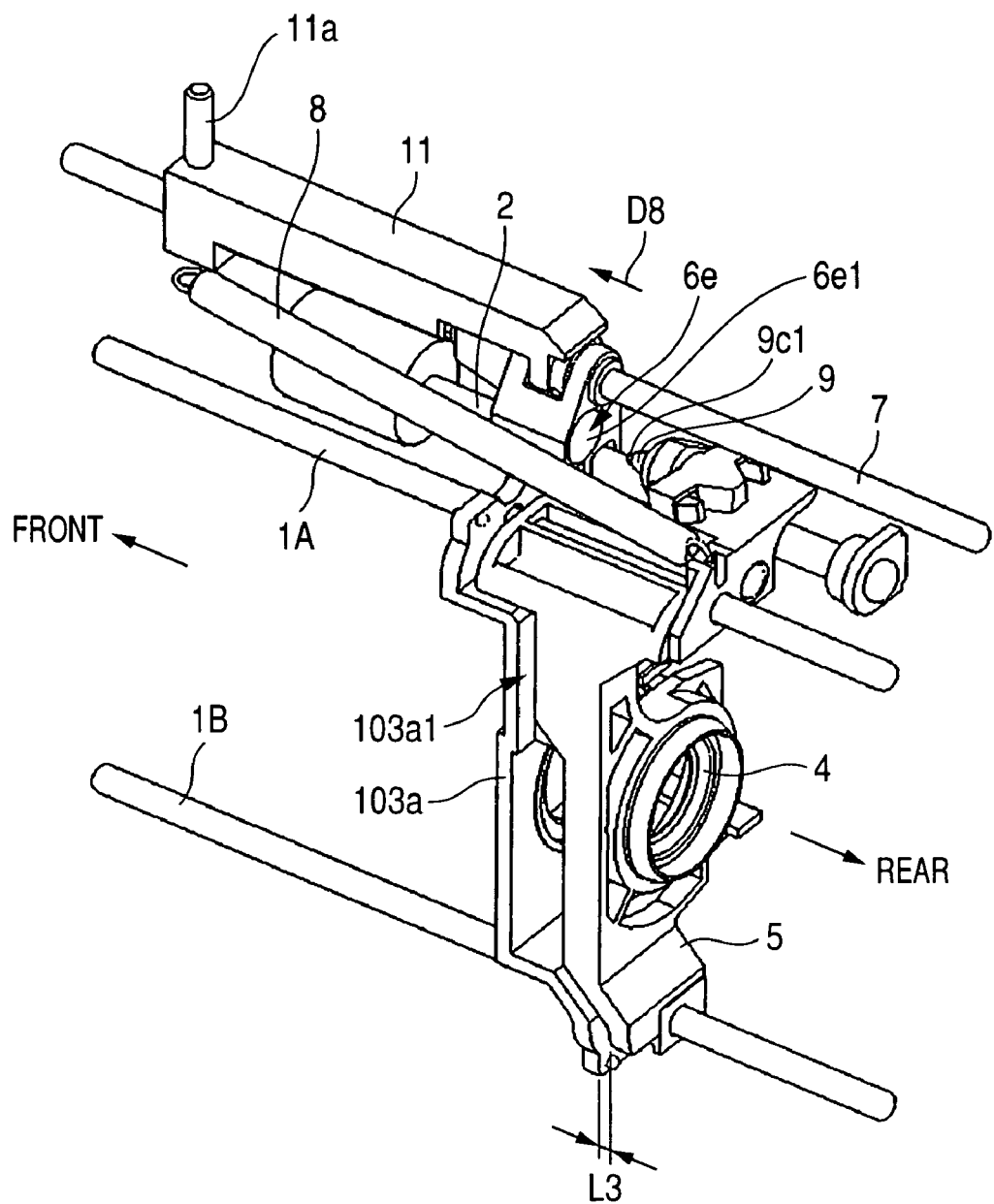
FIG. 8 is a perspective view of the movable lens, the lens frame for the movable lens, the clamper, the fixed-lens retaining frame, the engagement bar, and the related parts in the lens drive device of FIG. 1 in which the lens frame for the movable lens assumes its frontest position, and the clamper is axially spaced from the engagement bar held on the lens frame for the movable lens.

With reference to FIGS. 6-8, in a portion of the range where the clamper 6 is movable, the clamper 6 moves together with the lens frame 5. In the other portion of the range, the clamper 6 moves separately from the lens frame 5.

A link member 11 (not shown in FIG. 1) connected with the clamper 6 includes an arm-shaped member for transmitting a drive force from the clamper 6 to the lens barrier 105 (see FIG. 1) when the clamper 6 assumes a position within a front portion of its movable range. The link member 11 moves together with the clamper 6 along the clamper shaft 7.

In FIG. 6, the lens frame 5 assumes its rearmost position (the rear end of its movable range), and a lower end of the lens frame 5 is spaced from a lower end of the fixed-lens retaining frame 103a by an axial distance L2.

As the lead screw 2 rotates in a first direction, the clamper 6 moves frontward. Since the lens frame 5 is urged toward the clamper 6 by the coil spring 8 along a direction D6, the lens frame 5 moves frontward from its rearmost position (see FIG. 6) in accordance with the frontward movement of the clamper 6 while the engagement bar 9 remains seated between the lens frame 5 and the clamper 6. In this way, the lens frame 5 and the clamper 6 move frontward together. Specifically, the lens frame 5 linearly moves toward the fixed-lens retaining frame 103a along a direction D7.

As the lens frame 5 and the clamper 6 move frontward together, the axial distance between the lower end of the lens frame 5 and the lower end of the fixed-lens retaining frame 103a decreases. When the axial distance reaches a prescribed value L3 smaller than the axial distance L2, the lens frame 5 meets the movement limiting surface 103a1 on the fixed-lens retaining frame 103a and is therefore stopped by the fixed-lens retaining frame 103a as shown in FIG. 7. The fixed-lens retaining frame 103a inhibits the lens frame 5 from further moving frontward.

Thereafter, the clamper 6 further moves frontward in accordance with the first-direction rotation of the lead screw 2 while the lens frame 5 remains stopped by the fixed-lens retaining frame 103a. Thus, the clamper 6 moves separately from the lens frame 5.

As a result of the further frontward movement, the clamper 6 moves out of contact with the engagement bar 9 as shown in FIG. 8. At this time, the clamper 6 is disengaged from the lens frame 5. Then, the clamper 6 moves frontward away from the engagement bar 9 along a direction D8 in accordance with the first-direction rotation of the lead screw 2. The link member 11 moves together with the clamper 6. As the clamper 6 moves frontward away from the engagement bar 9, a pin 11a provided on a front end of the link member 11 enters an engagement slit 105a (see FIG. 1) in the lens barrier 105 so that the link member 11 falls into engagement with the lens barrier 105. The engagement of the link member 11 with the lens barrier 105 allows the lens barrier 105 to be closed and opened in accordance with frontward and rearward movement of the link member 11.

In the case where the clamper 6 moves frontward so that the link member 11 falls into engagement with the lens barrier 105, the link member 11 operates to close the lens barrier 105. On the other hand, in the case where the clamper 6 moves rearward so that the link member 11 moves out of engagement with the lens barrier 105, the link member 11 operates to open the lens barrier 105. Thus, when the clamper 6 engages with the lens frame 5 via the engagement bar 9, the lens barrier 105 is open.

While the clamper 6 remains out of contact with the engagement bar 9, the lens frame 5 is held at its frontest position (the front end of its movable range) by the coil spring 8 as shown in FIGS. 7 and 8.

As the lead screw 2 rotates in a second direction opposite to the first direction, the clamper 6 moves rearward. As the clamper 6 moves rearward from its position shown in FIG. 8, the concave surface 6e1 of the abutment section 6e of the clamper 6 meets the hemispherical portion 9c1 of the engagement bar 9. As the clamper 6 further moves rearward, the hemispherical portion 9c1 is slid and guided to a deeper part of the concave surface 6e1.

The diameter $\phi$ts of the abutment section 6e of the clamper 6, that is, the diameter $\phi$ts of the inlet of the recess defined by the concave surface 6e1 (see FIG. 3) is chosen so that the inlet of the recess can cover an area in which the position of the tip of the hemispherical portion 9c1 of the engagement bar 9 is confined as the axis CL9 of the engagement bar 9 moves and therefore inclines from the axis CL5 of the abutment section 5e of the lens frame 5 throughout the angular range determined by the difference of the diameter of the hole 10a of the holder 10 from that of the base 9k of the engagement bar 9. Preferably, the inlet of the recess is sufficiently greater in size than the above-mentioned area. Accordingly, the hemispherical portion 9c1 is slid and guided to a deeper part of the concave surface 6e1 after the concave surface 6e1 and the hemispherical portion 9c1 meet in conditions where the axis CL6 of the abutment section 6e and the axis CL9 of the engagement bar 9 are misaligned or noncoincident. Even when the axis CL9 of the engagement bar 9 inclines from the axis CL5 of the abutment section 5e of the lens frame 5 to the greatest degree, the concave surface 6e1 of the abutment section 6e of the clamper 6 can surely meet the hemispherical portion 9c1 of the engagement bar 9.

The engagement bar 9 may be held by the clamper 6 rather than the lens frame 5. In this case, a holder mounted on the clamper 6 is provided to enable the clamper 6 to hold the engagement bar 9.

Preferably, the engagement bar 9 is made of metal such as stainless steel or SUS material. The engagement bar 9 is formed by, for example, cutting a metal rod. The engagement bar 9 may be made of resin. In this case, the engagement bar 9 is formed by, for example, injection molding.

Preferably, the lens frame 5 and the clamper 6 are made of resin. The lens frame 5 and the clamper 6 are formed by, for example, injection molding.

The lens frame 5 may be replaced by a member to be linearly moved such as an optical pickup. In this case, the lens drive device 50 is changed into a member drive device or an optical-pickup drive device.

The concave surfaces 5e1 and 6e1 may be cup-shaped rather than cone-shaped.

The lens frame (the to-be-moved member) 5 may continue to move together with the clamper 6 as the clamper 6 moves throughout its movable range. In this case, the holder 10 may be omitted. The coil spring 8 may be replaced by an another member for relatively urging the lens frame (the to-be-moved member) 5 and the clamper 6 toward each other to provide connection therebetween via the engagement bar 9.

Figure 9:
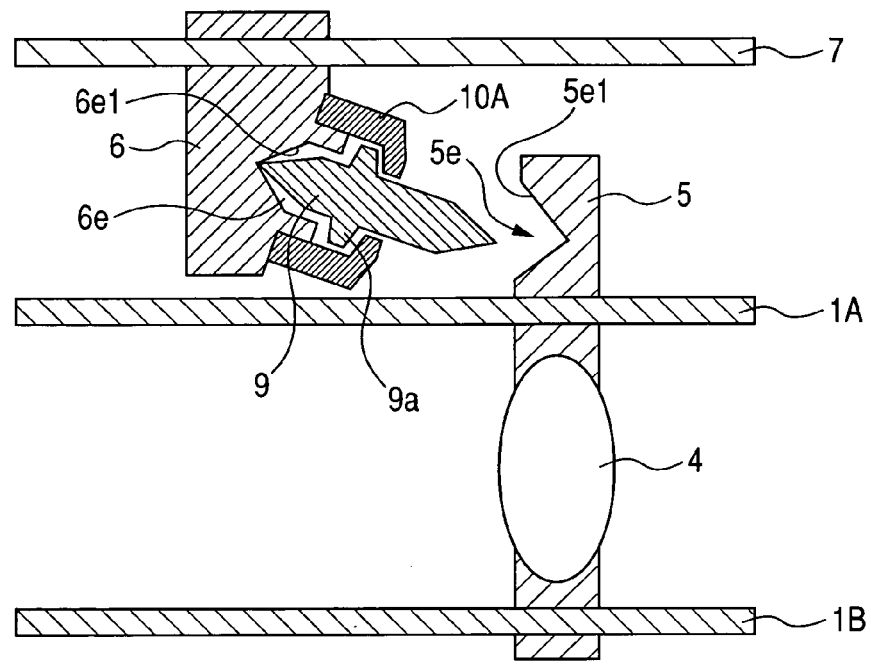
FIGS. 9 and 10 are sectional views of a portion of an optical block including a lens drive device (a linear motion device) according to another embodiment of this invention.
Figure 10:
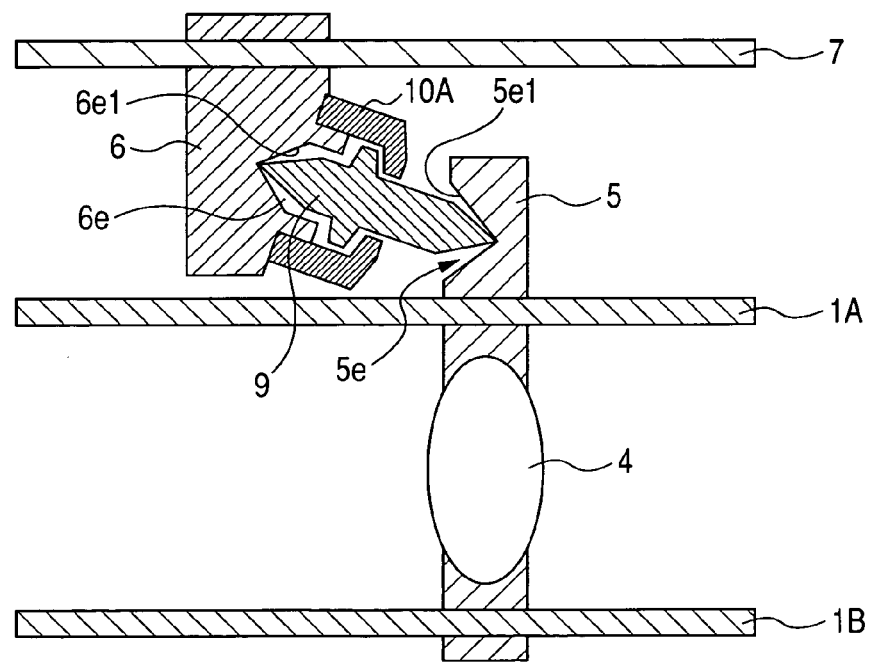

FIGS. 9 and 10 show another embodiment of this invention which is similar to the embodiment of FIGS. 1-8 except that the engagement bar 9 is held by the clamper 6 rather than the lens frame 5.

As shown in FIGS. 9 and 10, an approximately cup-shaped holder 10A is secured to the clamper 6. The holder 10A has a hole 10a extending through a bottom wall thereof. The engagement bar 9 extends through the hole 10a of the holder 10A. The flange 9a of the engagement bar 9 is located within the holder 10A. The outside diameter of the flange 9a is greater than the diameter of the hole 10a of the holder 10A so that the flange 9 is inhibited from moving through the hole 10a. The flange 9a and the front end of the engagement bar 9 are placed in the holder 10A. In this way, the engagement bar 9 is held by the clamper 6 via the holder 10A. Thus, the engagement bar 9 can move together with the clamper 6.

Normally, the engagement bar 9 is seated between the lens frame 5 and the clamper 6 as shown in FIG. 10. At this time, the lens frame 5 and the clamper 6 are in engagement via the engagement bar 9. In the case where the clamper 6 and the engagement bar 9 move frontward together while the lens frame 5 remains stopped, the engagement bar 9 moves out of contact with the lens frame 5 and is spaced therefrom as shown in FIG. 9. In this case, the clamper 6 is disengaged from the lens frame 5.

What is claimed is:

1. A lens drive device comprising:
   a guide shaft;
   a lens frame supported on the guide shaft and being linearly movable along the guide shaft;
   a lead screw extending parallel to the guide shaft;
   a clamper meshing with the lead screw and moving as the lead screw rotates;
   an intermediate member provided between the lens frame and the clamper;
   an urging member for urging the lens frame toward the clamper and enabling the intermediate member to be seated between the lens frame and the clamper in a manner such that an axis of the intermediate member is nonparallel to the guide shaft; and
   means for limiting movement of the lens frame and defining a movable range of the lens frame;
   wherein the clamper moves together with the lens frame when the lens frame is in its movable range except ends of the movable range, and the clamper moves separately from the lens frame when the lens frame is held in a position at one of the ends of its movable range by the limiting means.

2. A lens drive device as recited in claim 1, further comprising a holder for holding the intermediate member on one of the lens frame and the clamper.

* * * * *